United States Patent [19]

Bierens

[11] Patent Number: 4,506,910
[45] Date of Patent: Mar. 26, 1985

[54] AUTOMOTIVE VEHICLE SUSPENSION

[75] Inventor: John Bierens, Farmington, Mich.

[73] Assignee: Granning Suspensions, Inc., Livonia, Mich.

[21] Appl. No.: 420,921

[22] Filed: Sep. 21, 1982

[51] Int. Cl.³ .............................................. B60G 15/00
[52] U.S. Cl. ................................... 280/711; 267/64.21
[58] Field of Search ................................. 280/711–714; 267/64.21, 64.23

[56] References Cited

U.S. PATENT DOCUMENTS

| 3,653,683 | 4/1972 | Hendrickson | 280/713 |
| 3,664,681 | 5/1972 | Thaxton | 280/712 |
| 3,801,086 | 4/1974 | Raidel | 280/713 |

Primary Examiner—Richard A. Bertsch
Attorney, Agent, or Firm—Barnes, Kisselle, Raisch, Choate, Whittemore & Hulbert

[57] ABSTRACT

An automotive vehicle suspension comprising a beam, and an air spring between the vehicle frames and the beam. The air spring comprises an air spring lobe connected to the vehicle frame and a reinforced piston mounted on the beam in laterally offset relation to the longitudinal centerline of the beam.

18 Claims, 6 Drawing Figures

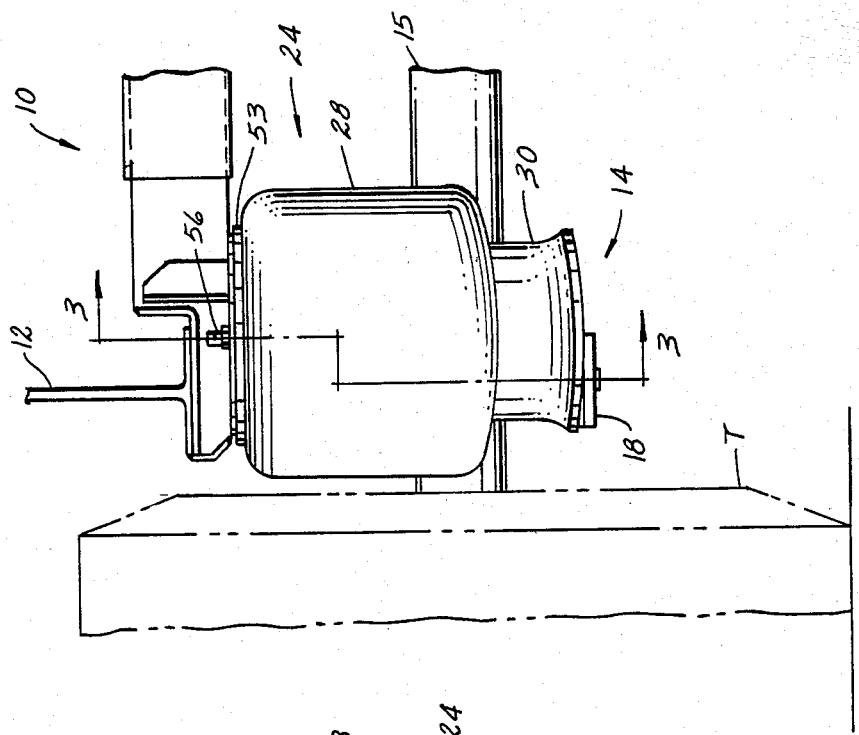
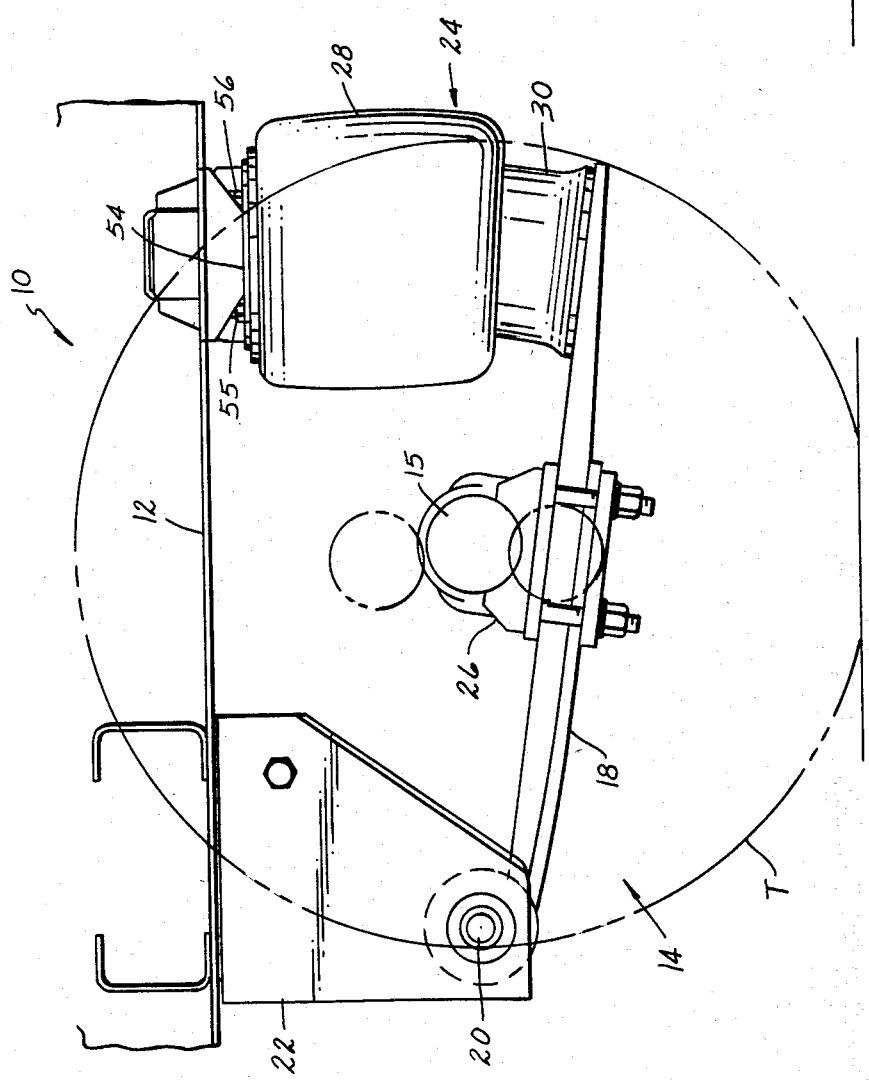

4,506,910

AUTOMOTIVE VEHICLE SUSPENSION

This invention relates to automotive vehicle suspensions and refers more particularly to an automotive vehicle suspension of the beam type having an air spring provided with a piston of novel construction mounted on the beam in laterally offset relation.

SUMMARY OF THE INVENTION

In an automotive vehicle having laterally spaced beam-type suspensions, it is desirable to space the beams as far apart as possible for maximum stability. However, when the suspensions have air springs to support the load, care must be taken to insure that the air springs operate clear of the vehicle tires. It has been found that the spacing between beams can be increased without risking contact of the air springs with the tires by employing a specially designed and reinforced air spring piston and mounting the same on the beam in laterally offset relation.

In accordance with the preferred constructions to be described hereinafter, the automotive vehicle suspension comprises an axle, a beam, a pivotal connection between the vehicle frame and one end portion of the beam, and an air spring between the vehicle frame and the other end portion of the beam. The air spring comprises an air spring lobe connected to the vehicle frame and a piston of reinforced construction mounted on the beam in laterally offset relation to the longitudinal centerline of the beam.

These and other objects and features of the invention will become more apparent as the following description proceeds especially when considered with the accompanying drawings.

BRIEF DESCRIPTION OF THE DRAWINGS

FIG. 1 is a side elevational view of an automotive vehicle suspension constructed in accordance with the invention.

FIG. 2 is an elevational view of the structure shown in FIG. 1, as viewed from the right.

DETAILED DESCRIPTION

Figure 3:
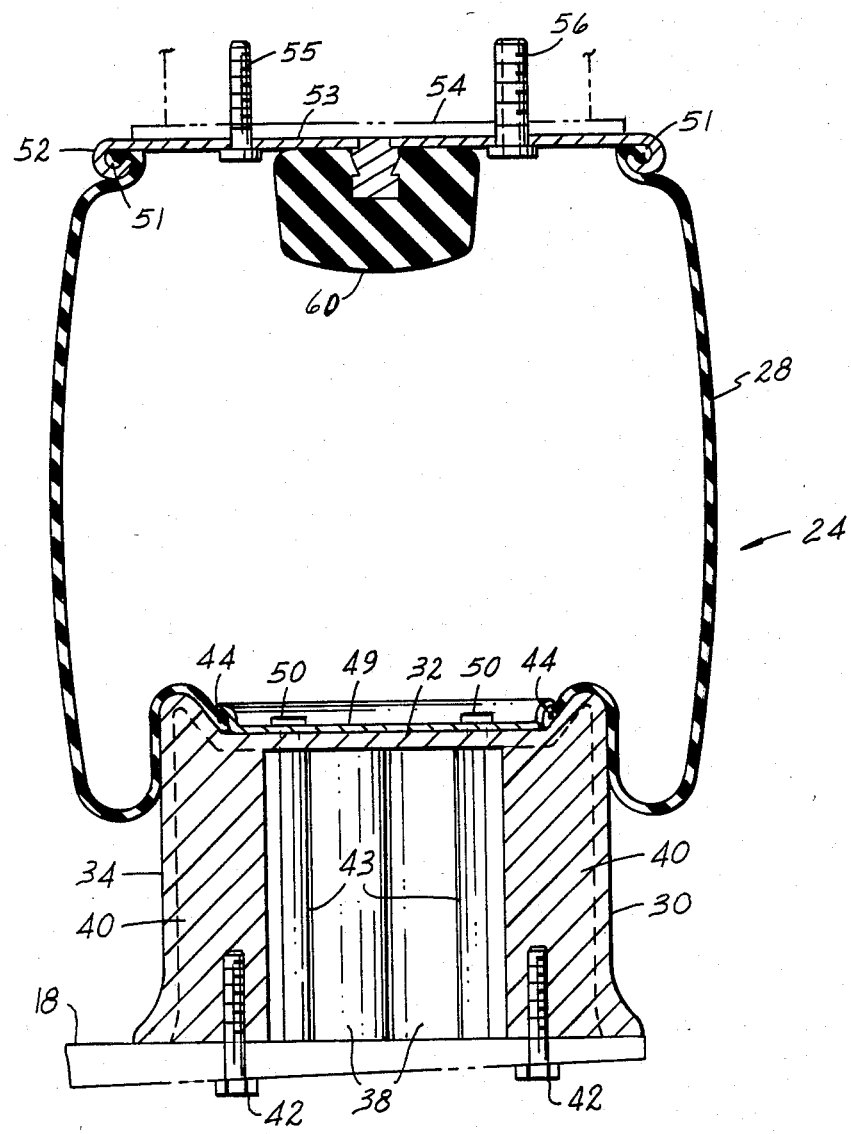
FIG. 3 is a sectional view taken on the line 3—3 in FIG. 2.

Referring now more particularly to the drawings and especially to FIGS. 1 to 4, the numeral 10 designates an automotive vehicle having a frame 12 from which a pair of ground engaging wheels are suspended by suspensions embodying the present invention. Only one such suspension 14 for one end of the axle 15 at one side of the vehicle is shown in the drawings, it being understood that a similar suspension for the other end of the axle at the opposite side of the vehicle will also be provided.

The suspension 14 comprises an elongated spring beam 18 extending generally lengthwise of the vehicle. Its front end is pivotally connected at 20 to a hanger bracket 22 secured to the frame 12. An air spring 24 is provided between the vehicle frame and the rear end of the beam. A saddle and U-bolt assembly 26 is provided to clamp the end of the axle to the mid-portion of the beam. The air spring allows the beam to swing up and down about its forward pivotal connection, as will be clear from the dotted line positions of the axle in FIG. 1.

The air spring comprises an air spring lobe 28 connected to the vehicle frame and a piston 30 mounted on the beam. The air spring lobe 28 is a flexible open-ended sleeve-like member, which may, for example, be made of an elastomeric material. The piston 30 is of inverted, generally bowl shape formed of suitable material such as aluminum, having a base 32 and an annular wall 34 extending downward from the base and terminating in a flat circular peripheral edge 36 disposed in a plane parallel to the base. The piston is reinforced internally by ribs 38 which extend vertically downward from the base 32 and terminate in the plane of the peripheral edge 36. Each rib is integrally joined at the top to the base and also at its sides to the annular wall of the piston throughout its full vertical extent. These ribs in the specific embodiment shown are symmetrically arranged in the form of a V, as shown in FIG. 4.

Figure 4:
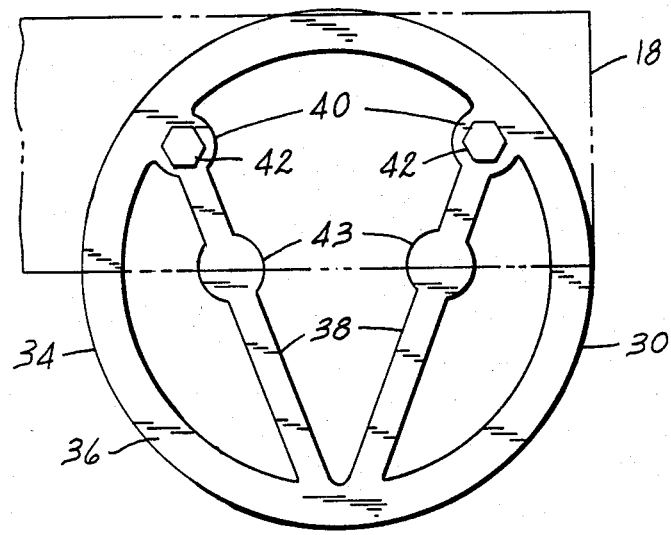
FIG. 4 in a bottom plan view of the piston shown in FIG. 3.

Referring particularly to FIGS. 2 and 4, it will be noted that the piston is mounted on the beam in laterally offset relation to the longitudinal centerline of the beam in a position such that the bottom of one side portion of the piston bears on the beam and the other side portion of the piston overhangs one side edge of the beam. The portions of the ribs near one side where they connect into the annular wall of the piston are formed with enlargements 40 extending from top to bottom thereof and at the bottom being formed with tapped holes for receiving suitable fasteners 42 by means of which the piston is rigidly secured to the beam on the centerline thereof. Intermediate their ends, the ribs are formed with enlargements 43 extending from top to bottom thereof and at the bottom providing rest surfaces for engaging one side edge of the beam. This can be clearly shown in FIG. 4. It will be noted in FIG. 4 that one half of the bottom area of the piston overlies the beam and is supported thereon by bearing engagement with the corresponding portions of the peripheral edge 36 of the annular wall and the bottom surfaces of the ribs from about the mid point of the enlargements 43 to the enlarged ends thereof to which the fasteners 42 are attached. It will be noted that a line joining the centers of the enlargements 43 passes through the geometric center of the annular wall.

This reinforced piston design enables the piston to have the strength necessary to withstand the stresses resulting from the offset mounting of the piston. However, the offset mounting of the piston permits the spacing between beams to be increased without bringing the air springs into contact with the tires T.

The lower end of the air spring lobe has a bead 44 which is clamped to the base of the piston by a plate 49 and fasteners 50. The upper end of the air spring lobe has a bead 51 secured in the curled marginal edge 52 of a mounting plate 53 which in turn is secured to a bracket plate 54 on the vehicle frame by fasteners 55 and 56. The fastener 56 may be a hollow member through which air under pressure can be introduced to the air spring lobe. A bumper 60 mounted on the plate 53 is adapted to contact the base of the piston during extreme swinging of the beam 18 to provide a limit to such movement. As the air spring lobe is compressed, it drapes over the surface of the base and annular wall of the piston as will be understood from FIG. 3.

Figure 5:
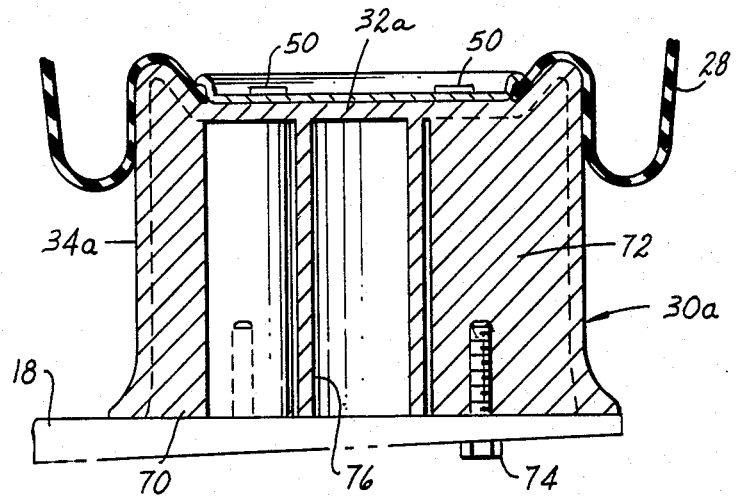
FIG. 5 is similar to a portion of FIG. 3 but shows a piston of modified construction.
Figure 6:
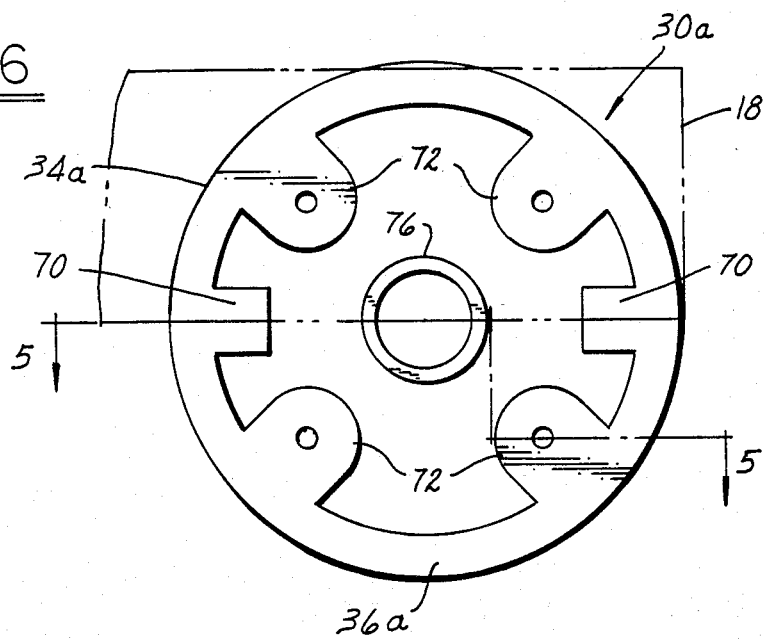
FIG. 6 is a bottom plan view of the piston shown in FIG. 5.

FIGS. 5 and 6 show a piston of modified construction. The piston 30a there shown, like piston 30, is of inverted, generally bowl shape having a base 32a and an annular wall 34a extending downward from the base and terminating in a flat peripheral edge 36a disposed in a plane parallel to the base. The internal construction of piston 30a is somewhat different than piston 30. The piston 30a is reinforced internally by ribs 70 which extend vertically downward from the base 32a and terminate in the plane of the peripheral edge 36a. Each rib is integrally joined at the top to the base and also to the annular wall of the piston throughout its full vertical extent. In the specific embodiment shown, ribs 70 are on the centerline of the piston and extend radially inwardly from opposite sides of the annular wall (see FIG. 6).

The piston has in addition to ribs 70, four equally spaced ribs or columns 72, two on each side of the ribs 70. These columns 72 extend vertically downward from the base and terminate in the plane of the peripheral edge 36a. Each column is integrally joined at the top to the base and also to the annular wall of the piston throughout its full vertical extent. The bottoms of ribs or columns 72 are tapped to receive fasteners 74 by means of which the piston is secured to the beam 18.

As was true in the case of piston 30, one half of the bottom area of piston 30a overlies the beam 18 and is supported thereon by bearing engagement with the corresponding portions of the peripheral edge 36a of the annular wall. The bottom surfaces of approximately one half the width of the ribs 70 as well as the bottom surfaces of two of the ribs 72 at one side of ribs 70 also bear on the beam. These latter two ribs 72 only have fasteners 74 which secure the piston to the beam. It will be understood that the opposite half of the piston 30a may also be bolted to the beam by applying fasteners to the other two ribs or columns 72.

The reinforced piston design in FIGS. 5 and 6 gives the piston the strength needed to withstand the stresses resulting from the offset mounting of the piston.

If desired for additional reinforcement, the piston 30a may have a central cylindrical column 76 integrally connected to the base and extending vertically downward therefrom, terminating at its lower end in the plane of the peripheral edge 36a for bearing contact with the beam over approximately one half its circumferential extent.

I claim:

1. An automotive vehicle suspension comprising an axle, means for supporting the vehicle frame on said axle comprising a beam, a pivotal connection between the vehicle frame and one end portion of said beam, and an air spring between the vehicle frame and the other end portion of said beam, said air spring comprising an air spring lobe and a piston, said piston being of inverted, bowl shape having an annular wall terminating at the bottom in a circular peripheral edge, said air spring lobe being connected to the vehicle frame, said piston being mounted on said beam in laterally offset relation to the longitudinal centerline of said beam such that said peripheral edge along one side portion of said piston bears on said beam and said peripheral edge along the other side portion of said piston overhangs one side edge of said beam, and fastening means securing said piston to said beam, said piston having reinforcement ribbing extending inwardly from said annular wall with the bottom surface thereof in the plane of said peripheral edge and bearing on said beam and on said one side edge of said beam.

2. The suspension defined in claim 1, wherein said ribbing comprises a pair of ribs on a centerline of said piston extending inwardly from opposite sides of said annular wall and along said one side edge of said beam.

3. The suspension defined in claim 2, wherein said fastening means comprises fastening elements on said one side portion of said piston.

4. The suspension defined in claim 3, wherein said ribbing includes additional ribs extending inwardly from said annular wall along said one side portion of said piston and adapted to receive said fastening elements.

5. The suspension defined in claim 4, wherein said ribbing includes other ribs extending inwardly from said annular wall along said other side portion of said piston and adapted to receive said fastening elements.

6. The suspension defined in claim 1, wherein said ribbing comprises a pair of ribs extending across said piston from said one side portion to the other.

7. The suspension defined in claim 6, wherein said ribs have enlargements for bearing engagement with said one side edge of said beam.

8. The suspension defined in claim 6, wherein said fastening elements are disposed in enlargements of said ribs.

9. The suspension defined in claim 8, wherein said ribs are integrally connected to said annular wall.

10. A piston adapted for use as a component of an air spring in a vehicle suspension, said piston being of inverted, bowl shape having an annular wall terminating at the bottom in a circular peripheral edge, said piston having reinforement ribbing extending inwardly from said annular wall with the bottom surface thereof in the plane of said peripheral edge, said piston having fastening means along one side portion thereof for mounting said piston, said piston being adapted to be mounted by said fastening means on the beam of such vehicle suspension in laterally offset relation to the longitudinal centerline of such beam in a position such that said peripheral edge along said one side portion of said piston bears on such beam and said peripheral edge along the opposite side portion of said piston overhangs one side edge of such beam, and such that the bottom surface of said ribbing bears on such beam and on said one side edge of such beam.

11. The piston defined in claim 10, wherein said ribbing comprises a pair of ribs on a centerline of said piston extending inwardly from opposite sides of said annular wall.

12. The piston defined in claim 11, wherein said fastening means comprises fastening elements on said one side portion of said piston.

13. The piston defined in claim 12, wherein said ribbing includes additional ribs extending inwardly from said annular wall along said one side portion of said piston and adapted to receive said fastening elements.

14. The piston defined in claim 13, wherein said ribbing includes other ribs extending inwardly from said annular wall along said opposite side portion of said piston and adapted to receive said fastening elements.

15. The piston defined in claim 10, wherein said ribbing comprises a pair of ribs extending across said piston from said one side portion of said opposite side portion thereof.

16. The piston defined in claim 15, wherein said ribs have enlargements for bearing engagement with said one side edge of such beam.

17. The piston defined in claim 15, wherein said fastening elements are disposed in enlargements of said ribs.

18. The piston defined in claim 17, wherein said ribs are integrally connected to said annular wall.

* * * * *